Dec. 13, 1932.   A. THOMA   1,890,473

SHOE FILLING METHOD

Filed Aug. 30, 1928

Inventor.
Andrew Thoma

Patented Dec. 13, 1932

1,890,473

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHOE FILLING METHOD

Application filed August 30, 1928. Serial No. 302,996.

The first object of my invention is to eliminate the high cost, slow setting, and shrinkage of those shoe fillers which contain evaporable or volatile solvents or dispersing agents, and which contain expensive compounds so dissolved or so dispersed. The principal such filler which I will use as an example is the "invisible middle-sole" filler marketed by the Beckwith Manufacturing Company, in which aqueous, dispersed, unvulcanized rubber latex is the ingredient of main importance and which is applied cold and sets in the form of a spread coagulum of unvulcanized or reclaimed rubber. Another such filler, but not so slow setting and expensive, is that disclosed in my application Ser. No. 295,342 filed July 24, 1928, and which employs a vulcanized latex and preferably also absorbent body material carrying included evaporable liquid and sets in the form of a spread coagulum of vulcanized rubber. Other such slow setting fillers are those having such included liquids, or, in general, any fillers which at the time of laying or spreading contain or develop evaporating components or compounds which must dissipate before the laid filler is properly set. In my application just mentioned one of the included liquids is aqueous soluble oil, and in my copending applications Serial No. 336,908 filed February 1, 1929 and Serial No. 336,670 filed January 31, 1929, I mention soapy solution as a dispersing agent held inactive or included in the body material (the same being also referred to in my application Ser. No. 211,157 filed August 6, 1927). These are examples of components which cause slow drying, the elimination of which feature or function thereof is one object of my present invention, and they are also present in their respective fillers for retarding or holding in suspense the coagulation or stiffening precipitation of the filler layer, and it is another object of my present invention to eliminate or offset this function quickly, as distinguished from slowly at the time the reason for its presence has come to an end viz. when the filler has been laid or spread. In other words these types of fillers are set or aided in setting by a reaction or the development of a chemical change, somewhat in the nature of the coagulation previously mentioned. This setting reaction as well as the coagulation must be held in check until the moment of spreading because when it has once taken place in the filler it is then too late to spread the filler thereafter. This checking means is slow drying and therefore I wish it understood that my invention includes means for making it, or making the laid filler containing it, quicker drying or quicker setting.

I employ a wide range of means. Viewed in the simplest, most inexpensive aspect, I eliminate the high cost and slow setting and shrinkage of the kinds of fillers mentioned by interposing in the plastic mass as it is being laid, a non-shrinking, inexpensive, light weight element which occupies a relatively large proportion of the space or bottom cavity, for example a strip or piece of cardboard. In this simplest form, a thin layer of the middle-sole filler, referring again to this as an example, is smeared over the bottom of the cavity, the strip of cardboard is then laid on this sticky, smeared layer of middle-sole, and then the rest of the cavity is filled by smearing another thin layer of the middle-sole filler on top of this piece of cardboard enough to complete the filling of the cavity. The result is that the cardboard is held tenaciously in place because of the sticky filler around it and yet the latter is maintained by the cardboard in such a thin or reduced layer and volume that its evaporable content has a chance to evaporate much more quickly than when in the larger bulk, as always used heretofore. The cardboard being non-shrinking holds the shrinkable middle-sole filler extended and thus makes the shrinking thereof impossible with relation to the cavity by reason of the strength of the cardboard which resists the same. The union of the cardboard and the plastic filler, being intimate and tenacious in the thin layers above and below the cardboard respectively as explained, holds the plastic layer in place and likewise holds the cardboard firm to the innersole. The cardboard being of very low cost and light weight takes the place of the corresponding amount of the high cost and heavy plastic material. In other words by simply putting in a piece of space occupying material, I have accomplished by this one step and simple method the three main objects first mentioned of eliminating high cost, slow setting and shrinkage. Two other factors are important. To understand the first factor, I mention that when the shoe is filled with middle sole filler alone its large bulk makes it imperative to wait until it has fully set before the outer sole can be laid and bottom rolled, as otherwise the un-set, putty-like filler will roll into a bunch at the toe and another bunch at the shank under the back and forth rolling pressure, and this setting period is usually about twenty-four hours from the time of inserting the filler until the shoe gets to the levelling roll. This has proved so serious that some factories have introduced expensive artificial means of drying for cutting down this long delay. With the step of my method already explained, it no longer becomes necessary to wait until the middle sole filler has entirely set as the interposed, fixed piece with its tenacious grip on the top layer and thin bottom layer of the filler, and the thin bottom layer having its strong grip on the innersole holds the laminated structure against shifting. This is because the interposed piece is itself incapable of bunching and the putty-like layers are too thin and too tenaciously held to be capable any longer of bunching. The first reason is that the adhesion tendency is stronger than the moving tendency. The second reason is that the middle sole being in thin layers, evaporates or dries much more quickly than when in the previous thick bulk. The third reason is that the interposed element presents in the relatively shallow middle of the shoe-bottom cavity a solid medium between the hard last and the levelling roll for the levelling roll to roll over instead of the previous thick, soft, yielding, putty-like layer. To understand the second factor, I explain that the middle sole filler has a very heavy weight per cubic foot or has a high specific gravity, and hence it fills a relatively limited number of pairs per pound. Incidently for this reason it becomes objectionable in making the shoes unnecessarily heavy, which is particularly objectionable in women's shoes where the present demand is for lightness. The use therefore of the light cardboard removes this weight and reduces the amount of the heavy filler required, and therefore makes the middle sole filler go just that much farther in filling just so many more shoes per pound.

Having stated the first step of my method in its simplest form, I now mention more advantageous forms thereof. By having the interposed layer or element porous, it absorbs the fluid of the filler immediately and thereby hastens the setting of the surrounding filler. The filler is still in the exceedingly thin, attenuated top and bottom layers already mentioned, and therefore evaporates to excellent advantage, but in addition thereto and simultaneously therewith, the porous interposed layer withdraws the fluid therefrom by absorption. In other words I now promote the setting of the filler by absorption as well as by evaporation. This is more advantageous than the simple statement just made would appear. The evaporation before mentioned takes place first on the surface and thereby sets and toughens or hardens and condenses the said surface against as ready evaporation from within, thus materially retarding and slowing down the evaporation from within. By interposing porous or absorptive means the fluid, which has been retarded from evaporation by the surface closing above referred to, is simultaneously withdrawn from within the mass. This step of absorption may be accomplished by a wide variety of means. Loosely sheeted jute or other paper stock may be used, or felt, or matted wood fibres, carpet silencer sheets, or any of the exceedingly cheap, porous fibrous materials on the market. Filler of the type set forth in my patents may be used loosely sheeted and cut into pieces as mentioned.

My method may be carried out in a highly efficient manner in most respects by employing small pieces of burlap, remnants of ingrain carpet or the like, cut to the proper sizes for the shoe cavities. In this case it becomes no longer necessary first to smear a preliminary thin layer of the putty-like or plastic filler in the shoe-bottom cavity. The operator simply drops the piece of burlap in the cavity and then places the plastic filler in a mass thereon and spreads it in the usual way. The open character of the burlap permits the sticky filler to go through instantly and thereby stick to the innersole and at the same time its binder is absorbed by the fibrous character of the burlap. The downward pressure on the plastic filler seems in fact to cause the burlap to rise more or less so that I find that it comes up into about the middle of the mass. The downward pressure seems to force the plastic filler through the meshes and then around underneath the warp and weft so as to raise the fabric. In other words, the whole becomes thoroughly interlocked. Preferably as coarse burlap as may be available and practicable is used. The usual shoe factory commonly has a vast amount of bags and wrappings of this character as waste material which can be conveniently cut up and used without appreciable expense, thereby accomplishing in a marked degree my three principal objects first mentioned, especially that of economy. In fact by using burlap or similar material having good tensile strength, said first object may be accomplished still more effectively as follows. The tensile strength and character of the burlap-like interlayer makes it practicable for the shoe manufacturer to dilute or extend the middle sole filler by mixing thereinto cheap aqueous pastes made of inert clays and the like, thereby extending the rubber-like binding agent therein which is the expensive component of said filler. This weakens the tensile strength of said filler but the same is at once reinforced or restored by the tensile strength of the burlap interlayer. In other words to the extent that the spread filler layer in the shoe-bottom cavity is reinforced by the tensile strength of the burlap interlayer, the tensile strength of the middle sole filler may be decreased, it being necessary merely to have sufficient final tensile strength, as the result of the combination, to maintain the laid and spread filler permanently in place in the completed shoe-bottom.

Instead of open mesh woven fabric, any form of sheeted or matted piece may be used with perforations or openings punched or formed in any manner therethrough so as to permit the plastic filler to be placed therethrough and cooperate therewith in substantially the same manner as with the burlap. If the piece is porous or absorbent it will function very much the same as the burlap although the latter is preferable because of its self-adjustment to all conditions and because it is a common waste product in the shoe factory. In any case it becomes possible to speed up the laying of the filler by using it in a thinner, freer flowing condition than would be practicable with the filler alone, when it must be quite putty-like. The cementing material or filler proper occupies only a part of the depth of the shoe cavity, the rest being occupied by the cheap interlayer of sheet material, preferably fibrous, and this fibrous interlayer in turn strengthens the mass, forms a central part of it, and is securely fastened to the innersole and likewise to the outer sole when the outer sole has been laid.

I now come to a final step of my method, namely that of promoting the coagulation of the binding ingredient or the setting of the filler by chemical reaction. This is accomplished by exposing the filler to a reacting agent which precipitates the coagulation of the binding ingredient or brings about a rapid setting by chemical reaction. For instance, in connection with the two latex fillers first mentioned, a solution of sulphate of aluminum will bring about the coagulation and setting. Very many other substances may be used to accomplish this result, particularly acids such as acetic acid or oxalic acid, and sulphates, such as sulphates of zinc, iron, or aluminum. The film of such solutions may be introduced in any way desired. It may be sprayed on, brushed on, rolled on, or intermixed. Preferably it is introduced by coating or saturating the interlayer with the same so that the contacting of the latter with the plastic filler sets it chemically. The chemical may be strong in which case the setting is instantaneous, or it may be weak, in which case the setting is slower. The latter is preferable as it permits further spreading movement by the operator, whereas when the coagulum is once firmly formed, no further smooth spreading is possible, and if moved, the adhesion is permanently disrupted.

In case vulcanized rubber latex is used as a binder it is preferably restrained from coagulating by dilution preferably by an alkaline liquor as noted, for instance, in the Schidrowitz Patent No. 1,443,149 of January 23, 1923. This alkaline condition can be destroyed by evaporation or chemical reaction, thus precipitating the coagulation of the vulcanized latex. A great range of means for producing this restrained condition may be used, but for cheapness water is preferably used as the carrying agent for the alkali, and hence by absorbing or removing the water the aforesaid condition is destroyed thus causing or permitting the coagulation (as for example with ammonia). The alkaline restraining condition can also be destroyed by a great range of chemical reactions, examples of which have just been given, which also precipitate the coagulation.

Without setting forth my invention more at length, it is further illustrated in the accompanying drawing in which Figs. 1 and 2 are vertical cross-sectional views showing the appearance of the laid filler according to my method, the former showing a sheet piece such as paste board, paper stock, felt or the like as an interlayer, and Fig. 2 showing a woven fabric such as burlap as an interlayer;

Fig. 3 is a top plan view of a fabric piece such as burlap, carpet warp, netting or the like;

Figure 1:
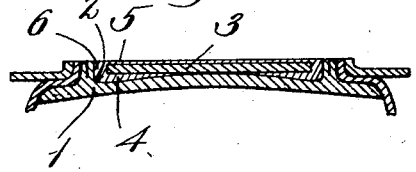
Figure 2:
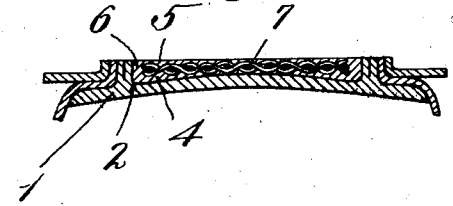
Figure 3:
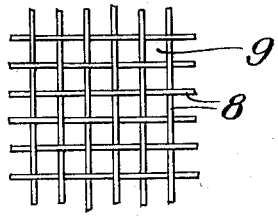

In view of the description already given it is unnecessary to explain at length. In Figs. 1 and 2 a usual innersole 1 with its cavity bottom 2 opening upward is shown having an interlayer 3 surrounded by plastic filler in the form of a bottom smear or layer 4, a top layer 5 and such more copious marginal portion 6 as the shape of the cavity requires. The interlayer 3 is of the kind shown in Figs. 4 and 5 viz. a fabricated sheet which may be of loosely sheeted jute or paper stock, or felt, or matted wood fibres, carpet silencer, or simply cardboard, or non-absorbent material. In Fig. 2 the interlayer is shown as a textile fabric 7 which may be burlap or any other textile fabric absorbent or non-absorbent. Fig. 3 illustrates the kind of fabric preferred namely a coarse burlap in which the strands 8 are separated sufficiently to form transverse openings 9 through which the sticky plastic filler may pass in order to get a strong hold upon the innersole bottom 2 as well as upon the fabric strands. The open mesh of the fabric or the openness of the loose fibrous sheet allows the cementing or filler mass to pass into it and through it so that it becomes a body forming member which also provides strength, non-shifting, space-taking and protecting features to the filler mass which cements the burlap to the innersole, and the burlap also absorbs, sustains and forms a receptacle for or holder of the mass among the meshes and a fibrous base for the cement to cling to. The very fact that the burlap is full of openings, facilitates the spreading thereon and the anchoring or holding of the soft, putty-like filler, and aids in retaining the filler mass in the cavity.

Figure 4:
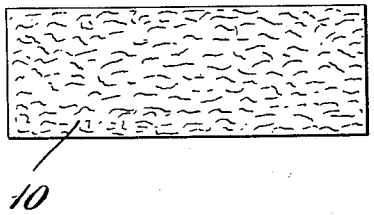
Fig. 4 is a top plan view of an interlayer piece in sheet form such as shown in section in Fig. 1.
Figure 5:
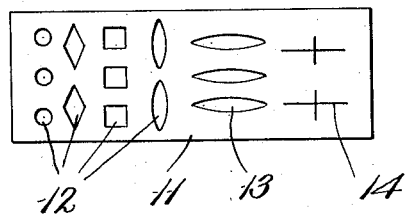
Fig. 5 is a similar top plan view of a foraminous sheet piece interlayer.

Fig. 4 shows a sheet-like piece 10 which is not foraminous, whereas Fig. 5 shows a similar shaped piece 11 which is provided with holes 12 of any shape desired, such as slits 13 formed as openings or slits 14. The latter slits will open sufficiently when the interlayer piece is not too rigid therefor.

In the case of the burlap the strands act as wicks to take out moisture, or in case they are smeared with chemicals of the kind described, they serve to carry the chemicals into the filler or against the contacting portions thereof. In both cases the burlap removes or neutralizes or off-sets the restraining agent in the filler which has theretofore prevented setting or coagulation. In case the burlap has been previously treated with chemical or has only a little chemical or is only partially coated with the same, it serves the double purpose of taking out moisture and introducing chemical reaction. If it is saturated with the chemical, it causes the chemical in the filler and the chemical in the burlap to combine, thereby leaving the aqueous carrier free to be absorbed or evaporate. The burlap and for that matter all the interlayers mentioned add their tensile strength and tenacity and stability to that of the binder in the commercial filler, and hence it becomes possible to use very little of the tough, expensive binder ingredient of the filler. This is accomplished by weakening or diluting and expending or extending the bulk of the commercial filler with many fluxing means for promoting the distribution of the expensive element in the commercial filler. If the chemical treatment is applied by a roller or pad or other superficial application, it produces an outside skin or coagulation at once which tends to facilitate the progress of the shoe in the shoe factory, and in the latex filler of my application first mentioned, produces a permanently waterproof surface. A filler of the type of the middle sole filler already mentioned can be greatly improved by mixing with it more or less comminuted body material. In such cases it is necessary for rapid and easy mixing that the comminuted material be first wetted, as with water or other liquid or pasty fluxing agent, in order to effect the stable mixture and more especially to guard against withdrawing prematurely from the uncoagulated latex the carrying liquid thereof. Moreover instead of first charging the cork or other absorbent body material with its own supply of liquid, the sufficient excess of liquid may be added to the latex solution and then mixed with the body material dry. In either case the result would be the same, that when mixed the body material would become charged with the excess moisture. In other words if the balance were destroyed by inserting the absorbent body material dry in a normal latex solution, thereby withdrawing from the latex the liquefying agent, the latex would immediately congeal or curdle prematurely in storage or in transit. Therefore to prevent this premature withdrawing of the liquid and maintain the proper dispersion of the latex, the cork or other comminuted absorbent body material, either before or after mixing, is charged with a fluid. This type of filler is set forth and duly claimed in my application Ser. No. 211,157 filed August 6, 1927.

It will be understood that my method of absorption, promotion of evaporation, speeding the slow drying due to excess moisture or to slow coagulation or stiffening, speeding the stiffening of the spread filler layer, and reducing the expense to the shoe manufacturer, is not limited to the rubbery or latex species of filler mentioned herein, but is applicable to any liquid-laden or liquid-developing filler and to any slow stiffening or coagulating filler, using the term coagulating in its broad sense of congealing, becoming viscid and thickened or curdled. It is applicable to a filler which is not in itself sticky or which loses its adhesiveness upon being spread or disrupted (as would be the case with gelatin or the like), in which case the desired stickiness is provided by means of the interlayer piece or interlayer fragments or other shapes of interlayer material which are made to carry in or with themselves the necessary adhesiveness. For instance the piece 3 is impregnated or coated with adhesive of animal origin such as the glues, or vegetable origin such as dextrine or any of the adhesives mentioned in my filler patents. In other words I wish it understood that my present method invention is broadly novel and the claims are intended to cover a wide range of steps and modifications thereof.

I claim

1. The method of filling shoes, which comprises applying plastic filler to the shoe-bottom cavity, and substantially contemporaneously with the application of the plastic filler introducing into said pastic filler a separate chemical stiffener.

2. The herein described method, comprising applying to the shoe-bottom cavity filler material which is held from quick setting by a restraining agent in said filler, and uniting in the shoe-bottom cavity with said filler means for eliminating the restraining influence of said agent.

3. The herein described method, comprising applying to the shoe-bottom cavity filler material which is held from quick setting by a restraining agent in said filler, and uniting in the shoe-bottom cavity with said filler chemical means for eliminating the restraining influence of said agent.

4. The herein described method, which comprises applying to the shoe-bottom cavity plastic filler which has a capacity to stiffen in response to chemical action, and introducing in said cavity to said filler at substantially the time of applying it to the shoe-bottom, a chemical adapted to stiffen said plastic filler.

5. The herein described method, which comprises applying to the shoe-bottom cavity a plastic filler responsive to chemical action, and applying over the surface of said filler after it is laid in said cavity, a chemical adapted to stiffen the top surface of said filler.

6. The herein described method, which comprises applying to the shoe-bottom cavity, a plastic filler responsive to chemical action, and applying over the surface of said filler after it is laid in said cavity, a chemical adapted to stiffen the top surface of said filler and combining with the inner portion of said filler at substantially the time of applying it to the shoe-bottom absorbent means tending to stiffen said inner portion.

7. The herein described method, which comprises applying to the shoe-bottom cavity, a plastic filler responsive to chemical action, and applying over the surface of said filler after it is laid in said cavity, a chemical adapted to stiffen the top surface of said filler and combining with the inner portion of said filler at substantially the time of applying it to the shoe-bottom absorbent and chemical carrying means.

8. The herein described method, comprising applying plastic filler material in an alkaline dispersed condition to the shoe-bottom cavity and at some stage of the filling process combining with said filler means for eliminating the alkalinity of the dispersing agent and precipitating coagulation.

9. The method of filling shoes which comprises applying plastic, spreadable filler material to a shoe bottom cavity, and substantially contemporaneously therewith and at the time of laying and spreading the plastic filler material combining therewith a space occupying layer in the form of an integral piece of flexible, fibrous, sheet material.

10. The method of filling shoes which comprises applying plastic, spreadable filler material to a shoe bottom cavity, and substantially contemporaneously therewith and at the time of laying and spreading the plastic filler material combining therewith a space occupying layer in the form of an integral piece of sheet material made of paper stock.

11. The method of filling shoes which comprises applying plastic, spreadable filler material to a shoe bottom cavity, and substantially contemporaneously therewith and at the time of laying and spreading the plastic filler material combining therewith a space occupying layer in the form of an integral piece of absorbent sheet material.

12. The method of filling shoes which comprises applying plastic, spreadable filler material to a shoe bottom cavity, and substantially contemporaneously therewith and at the time of laying and spreading the plastic filler material combining therewith a space occupying layer in the form of a piece of open mesh textile fabric.

13. The method of filling shoes which comprises applying plastic, spreadable filler material to a shoe bottom cavity, and substantially contemporaneously therewith and at the time of laying and spreading the plastic filler material combining therewith a space occupying layer in the form of a piece of burlap.

Signed by me at Cambridge, Mass., this twenty-ninth day of August, 1928.

ANDREW THOMA.